(12) United States Patent
Bjordammen (10) Patent No.: US 9,083,998 B2
(45) Date of Patent: Jul. 14, 2015

(54) RIGHTS METADATA CACHING BY SWITCHED DIGITAL VIDEO MULTIPLEXERS

(75) Inventor: David M. Bjordammen, Blue Bell, PA (US)

(73) Assignee: ARRIS Technology, Inc., Suwanee, GA (US)

(*) Notice: Subject to any disclaimer, the term of this patent is extended or adjusted under 35 U.S.C. 154(b) by 177 days.

(21) Appl. No.: 12/956,556

(22) Filed: Nov. 30, 2010

(65) Prior Publication Data

US 2012/0137321 A1 May 31, 2012

(51) Int. Cl.
| | |
|---|---|
| H04N 7/167 | (2011.01) |
| H04N 7/173 | (2011.01) |
| H04N 21/254 | (2011.01) |
| H04N 21/2225 | (2011.01) |
| H04N 21/2347 | (2011.01) |
| H04N 21/647 | (2011.01) |

(52) U.S. Cl.
CPC ....... *H04N 21/2541* (2013.01); *H04N 21/2225* (2013.01); *H04N 21/2347* (2013.01); *H04N 21/64784* (2013.01)

(58) Field of Classification Search
None
See application file for complete search history.

(56) References Cited

U.S. PATENT DOCUMENTS

| | | | | |
|---|---|---|---|---|
| 2004/0123313 | A1* | 6/2004 | Koo et al. | 725/31 |
| 2007/0033282 | A1* | 2/2007 | Mao et al. | 709/226 |
| 2007/0242829 | A1* | 10/2007 | Pedlow, Jr. | 380/277 |
| 2008/0219436 | A1* | 9/2008 | Chen et al. | 380/30 |
| 2011/0093883 | A1* | 4/2011 | Sun | 725/31 |

FOREIGN PATENT DOCUMENTS

| | | |
|---|---|---|
| KR | 10-0881724 B1 | 2/2009 |
| WO | 2007/132165 A1 | 11/2007 |
| WO | 2008/112443 A1 | 9/2008 |

OTHER PUBLICATIONS

Vecima Networks, Switched Digital Video Architecture Overview, http://www.vecima.com/com_pdf/sdvoverview_wp_d01.pdf (6 pages).
EPC Extended Search Report, RE: Application #11009144.4-1241; Mar. 15, 2012.
Office Action, Korean Application No. 10-2011-126052, Sep. 12, 2012.
SIPO Office Action, dated Feb. 28, 2015 for Chinese Patent Application No. 201110457041.X, Document No. 2015022501077360.

* cited by examiner

*Primary Examiner* — Nathan Flynn
*Assistant Examiner* — William J Kim
(74) *Attorney, Agent, or Firm* — Stewart M. Wiener (57) ABSTRACT

A system and method that receives a tune request in a switched digital video (SDV) system, where the tune request includes an identifier of a set-top box, and an SDV channel. The method receives a content stream associated with the SDV channel. The method retrieves conditional access (CA) information from a local cache, where the CA information includes encryption information for the content stream. The method converts the content stream to an encrypted content stream using the encryption information, and sends the encrypted content stream to the set-top box.

15 Claims, 5 Drawing Sheets

RIGHTS METADATA CACHING BY SWITCHED DIGITAL VIDEO MULTIPLEXERS

BACKGROUND

A digital video system allows a multiple system operator (MSO) to deliver television programs and multimedia services to subscribers. The capacity, or bandwidth, of the system determines the programs and services that the MSO delivers. In legacy digital video systems, the MSO sends all of the available programs and services to the subscriber's set-top box on a single cable. Thus, the only way to increase the programs and services available to subscribers in legacy digital video systems is to increase the bandwidth of the cable.

Switched digital video (SDV) systems are an improvement to legacy digital video systems that require less bandwidth to deliver high-bandwidth digital services. SDV systems allow the MSO to send only the content requested by a service group, where each service group includes a set of set-top boxes with visibility to a common set of switched edge devices. To make this possible, the subscriber's set-top box communicates with a network side video server to request the program that the subscriber wants to watch in real-time. The SDV system responds by commanding the edge devices associated with the subscriber's service group to deliver the requested program to the subscriber's service group. Thus, the service group only receives the programs that subscribers in the service group are watching.

Prior art SDV systems encrypt a content stream before it reaches an edge device, typically using a bulk encryption approach. These prior art SDV systems rely on a resource/session manager (e.g., an SDV manager) to command the edge device to receive the encrypted content stream and route it to the appropriate set-top box. Recently, it has become cheaper and more efficient to integrate the encryption function into the edge devices. Since the command from the resource/session manager to the edge device to route a service does not carry the encryption information that the edge device needs, the edge device retrieves the encryption information from a conditional access (CA) system (e.g., an event information scheduler (EIS)). Since every edge device in the SDV system will need to retrieve the encryption information, this creates a possible performance problem at the edge devices because the latency (i.e., time delay) between the channel tune request and the display of the video stream may not meet the subscriber's expectation.

There is a demand for a method and system improving the processing performance at the edge device to avoid an undesirable tuning latency when tuning to a channel in an SDV system. The presently disclosed invention satisfies this demand.

SUMMARY

Aspects of the present invention provide a system and method that receives a tune request in a switched digital video (SDV) system, where the tune request includes an identifier of a set-top box, and an SDV channel. The method receives a content stream associated with the SDV channel. The method retrieves conditional access (CA) information from a local cache, where the CA information includes encryption information for the content stream. The method converts the content stream to an encrypted content stream using the encryption information, and sends the encrypted content stream to the set-top box.

DETAILED DESCRIPTION

Figure 1:
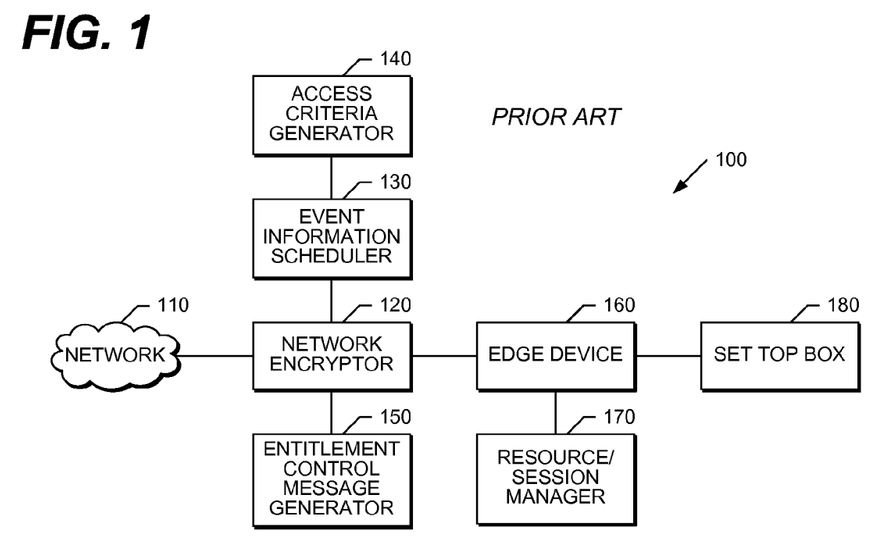
FIG. 1 is a network diagram that illustrates one embodiment of the hardware components of a prior art system.

FIG. 1 is a network diagram that illustrates one embodiment of the hardware components of a prior art system. The switched digital video (SDV) system 100 shown in FIG. 1 includes a network 110, network encryptor 120, edge device 160, and set-top box 180. The network encryptor 120 communicates with a conditional access (CA) system that includes an access criteria generator (ACG) 140, event information scheduler (EIS) 130, and entitlement control message generator (ECMG) 150. The edge device 160 receives commands from a resource/session manager 170 to display a content stream on the set-top box 180. The SDV system 100 shown in FIG. 1 may include any number of interconnected networks 110, network encryptors 120, edge devices 160, set-top boxes 180, ACGs 140, EISs 130, ECMGs 150, and resource/session managers 170.

The network 110, in one embodiment, is a public communication network or wide area network (WAN). The present invention also contemplates the use of comparable network architectures. Comparable network architectures include the Public Switched Telephone Network (PSTN), a public packet-switched network carrying data and voice packets, a wireless network, and a private network. A wireless network includes a cellular network (e.g., a Time Division Multiple Access (TDMA), Code Division Multiple Access (CDMA), or Orthogonal Frequency Division Multiplexing (OFDM) network), a satellite network, and a wireless Local Area Network (LAN) (e.g., a wireless fidelity (Wi-Fi) network). A private network includes a LAN, a Personal Area Network (PAN) such as a Bluetooth network, a wireless LAN, a Virtual Private Network (VPN), an intranet, or an extranet. An intranet is a private communication network that provides an organization such as a corporation, with a secure means for trusted members of the organization to access the resources on the organization's network. In contrast, an extranet is a private communication network that provides an organization, such as a corporation, with a secure means for the organization to authorize non-members of the organization to access certain resources on the organization's network. The system also contemplates network architectures and protocols such as Ethernet, Gigabit Ethernet, Internet Protocol, and Transmission Control Protocol. In various embodiments, the network 110 will support a variety of network interfaces, including 802.3ab/u/etc., Multimedia over Coax Alliance (MoCA), and 801.11.

The network encryptor 120 receives clear content streams from the network 110 and uses a bulk encryption approach to produce encrypted content streams that it outputs to the edge device 160. The edge device 160 is an integrated access device that multiplexes and routes the encrypted content to the appropriate set-top box 180 based on commands received from the resource/session manager 170. By separating the encryption function from the edge device 160, the SDV system 100 shown in FIG. 1 allow for "generic" third-party edge devices that do not require special access control hardware or functions. In addition, since the number of edge devices 160 in the SDV system 100 shown in FIG. 1 will typically outnumber the number of network encryptors 120, it is a less expensive alternative to separate the encryption function from the edge device 160.

In the SDV system 100 shown in FIG. 1, the ACG 140 generates CA information (e.g., rights metadata (RMD), and access criteria) associated with each scrambled event and passes the CA information to the EIS 130. The network encryptor 120 identifies the encrypted content streams to the EIS 130 and is responsible for storing all content stream identification information, schedule information, and configuration information for the SDV system 100 shown in FIG. 1. The EIS 130 provides the CA information associated with each content stream to the network encryptor 120. The network encryptor 120 provides the CA information to the ECMG 150, and receives entitlement control messages (ECMs) (i.e., a control word and access criteria for each scrambled program stream) in response. Finally, when a subscriber operating the set-top box 180 requests to tune to a new SDV channel, the resource/session manager 170 sends a command to the edge device 160 to instruct the edge device 160 to route a specific encrypted content stream from the network encryptor 120 to the set-top box 180. The set-top box 180 is a computing device that receives, decodes, and displays data and video content, and allows a subscriber to access the services that the SDV system 100 shown in FIG. 1 provides.

There have been some changes to the assumptions that drove the prior art SDV system 100 shown in FIG. 1. In some cases it is now cheaper and more efficient to integrate the encryption function into the edge devices. One driver for this change is the proliferation of many content streams due to support for many advertising zones. In today's highly regionalized systems (i.e., having many advertising zones), there is less opportunity to share bulk encrypted streams across multiple edge devices. Supporting hundreds of different content streams (multiple copies of each channel, one for each ad zone) not only requires the deployment of many bulk encryption resources, but also increases the load on the Internet Protocol (IP) backbone because it requires the network to carry both the clear and encrypted version of every content stream.

Figure 2:
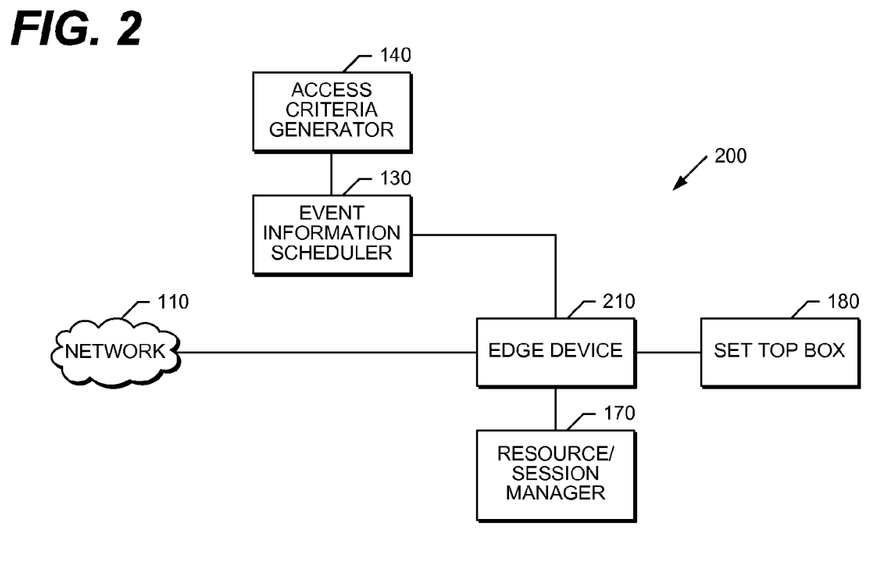
FIG. 2 is a network diagram that illustrates one embodiment of the hardware components of a system that performs the present invention.

FIG. 2 is a network diagram that illustrates one embodiment of the hardware components of a system that performs the present invention. The SDV system 200 shown in FIG. 2 includes a network 110, edge device 210, and set-top box 180. The edge device 210 communicates with a conditional access (CA) system that includes an access criteria generator (ACG) 140, and event information scheduler (EIS) 130. The edge device 210 receives commands from a resource/session manager 170 to display a content stream on the set-top box 180. The SDV system 200 shown in FIG. 2 may include any number of interconnected networks 110, edge devices 210, set-top boxes 180, ACGs 140, EISs 130, and resource/session managers 170.

The edge device 210 shown in FIG. 2 receives clear content streams from the network 110. The edge device 210 is an integrated access device that multiplexes and routes the encrypted content to the appropriate set-top box 180 based on commands received from the resource/session manager 170. The edge device 210 also includes an encryption module to produce encrypted content streams from the clear content streams. In the SDV system 200 shown in FIG. 2, the ACG 140 generates CA information (e.g., rights metadata (RMD), and access criteria) associated with each content stream and passes the CA information to the EIS 130. The edge device 210 communicates with the EIS 130 to identify content streams to the EIS 130 and receive CA information in response. Since the edge device 210 needs to encrypt the content stream and retrieve the encryption information, this creates a possible performance problem because the latency (i.e., time delay) between the channel tune request and the display of the video stream may not meet the subscriber's expectation.

The core of the possible performance problem is that the command to route a service to the edge device 210 comes from the resource/session manager 170, but this communication interface does not carry the CA information that the edge device 210 needs to encrypt content stream. In one embodiment, the EIS 130 provides the CA information. The possible performance problem occurs because if many edge devices 210 are pulling CA information in real-time from the EIS 130, then those edge devices 210 will excessively burden the EIS 130 and result in undesirable tuning latencies. The present invention addresses this possible performance problem by having the edge device 210 proactively fetch the CA information from the EIS 130 for all possible SDV services, and storing the fetched CA information in a local cache. Since the CA information is fairly static, once the edge device 210 has locally cached all of the CA information, the edge device 210 only has to check periodically (e.g., every 15 minutes) for updates to the CA information. When the resource/session manager 170 sends a command to the edge device 210, the edge device 210 will have the CA information that it needs in the local cache and will not have to communicate with the EIS 130 to retrieve the CA information. The edge device 210 can therefore quickly receive, encrypt, and route the desired service without negatively impacting the latency of providing the desired service to the subscriber.

Figure 3:
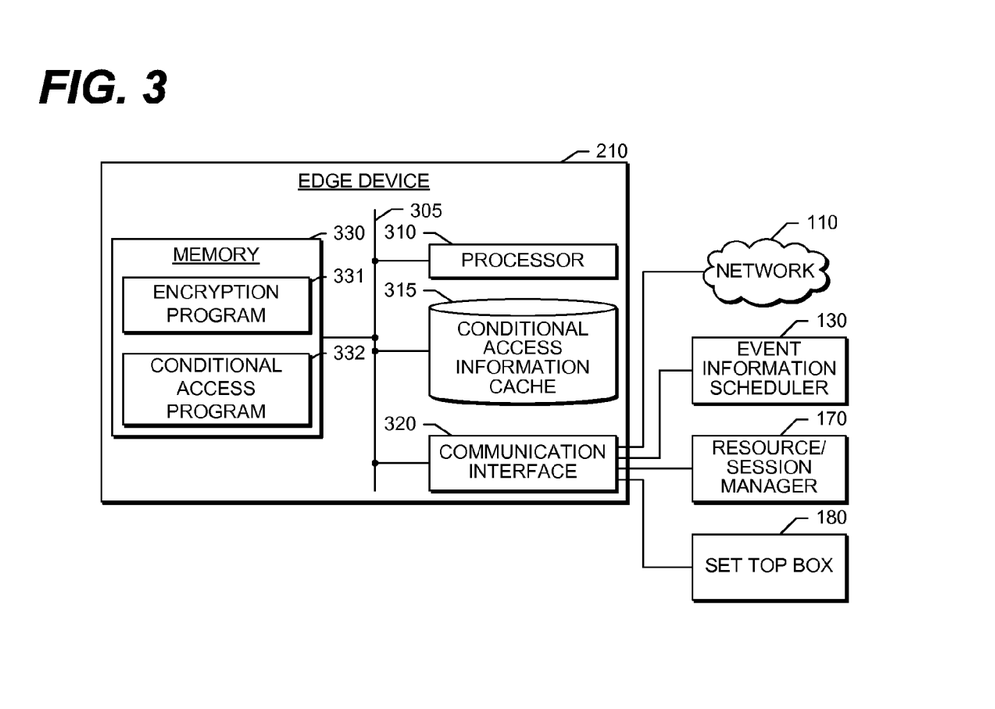
FIG. 3 is a block diagram that illustrates, in detail, one embodiment of the hardware components shown in FIG. 2.

FIG. 3 is a block diagram that illustrates, in detail, one embodiment of the hardware components shown in FIG. 2. In particular, FIG. 3 illustrates the hardware components and software comprising the edge device 210 shown in FIG. 2.

The edge device 210, in one embodiment, is a general-purpose computing device that performs the present invention. A bus 305 is a communication medium that connects a processor 310, conditional access information cache 315 (such as rights metadata (RMD), access criteria, or the like), communication interface 320, and memory 330 (such as Random Access Memory (RAM), Dynamic RAM (DRAM), non-volatile computer memory, flash memory, or the like). The communication interface 320 connects the edge device 210 to the network 110, event information scheduler (EIS) 130, resource/session manager 170, and set-top box 180. In one embodiment, the implementation of the edge device 210 is an application-specific integrated circuit (ASIC).

The processor 310 performs the disclosed methods by executing the sequences of operational instructions that comprise each computer program resident in, or operative on, the memory 330. The reader should understand that the memory 330 may include operating system, administrative, and database programs that support the programs disclosed in this application. In one embodiment, the configuration of the memory 330 of the edge device 210 includes an encryption program 331, and conditional access program 332. The encryption program 331 converts a content stream from the network 110 into an encrypted content stream. The conditional access program 332 populates the data stored in the conditional access information cache 315, updates the data, and uses the data to create the encrypted content stream. The encryption program 331 and conditional access program 332 perform the methods of the present invention disclosed in detail in FIG. 6 and FIG. 7. When the processor 310 performs the disclosed methods, it stores intermediate results in the memory 330 or conditional access information cache 315. In another embodiment, the memory 330 may swap these programs, or portions thereof, in and out of the memory 330 as needed, and thus may include fewer than all of these programs at any one time.

Figure 4:
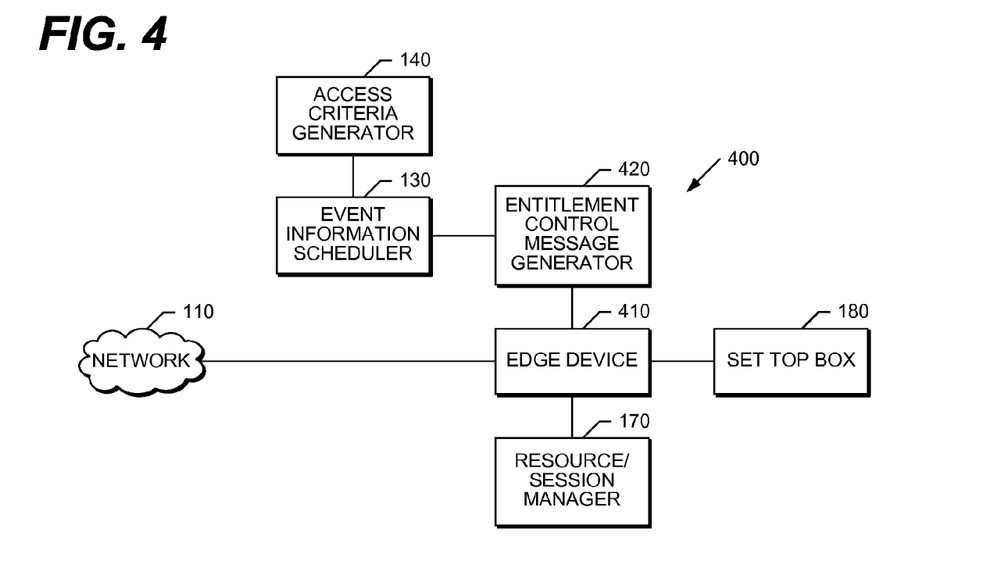
FIG. 4 is a network diagram that illustrates another embodiment of the hardware components of a system that performs the present invention.

FIG. 4 is a network diagram that illustrates one embodiment of the hardware components of a system that performs the present invention. The SDV system 400 shown in FIG. 4 is a variation on the SDV system 200 shown in FIG. 2. The SDV system 400 shown in FIG. 4 includes a network 110, edge device 410, and set-top box 180. The edge device 410 communicates with a conditional access (CA) system that includes an access criteria generator (ACG) 140, event information scheduler (EIS) 130, and entitlement control message generator (ECMG) 420. The edge device 410 receives commands from a resource/session manager 170 to display a content stream on the set-top box 180. The SDV system 400 shown in FIG. 4 may include any number of interconnected networks 110, edge devices 210, set-top boxes 180, ACGs 140, EISs 130, ECMGs 420, and resource/session managers 170.

The edge device 410 shown in FIG. 4 receives clear content streams from the network 110. The edge device 410 is an integrated access device that multiplexes and routes the encrypted content to the appropriate set-top box 180 based on commands received from the resource/session manager 170. The edge device 410 also includes an encryption module to produce encrypted content streams from the clear content streams. In the SDV system 400 shown in FIG. 4, the ACG 140 generates CA information (e.g., rights metadata (RMD), and access criteria) associated with each content stream and passes the CA information to the EIS 130. The ECMG 420 communicates with the EIS 130 to identify content streams to the EIS 130 that it receives from the edge device 410, and receive CA information in response which it passes back to the edge device 410. To avoid the possible performance problem described above in the description of FIG. 2, the ECMG 420 shown in FIG. 4 is responsible for creating and managing the CA information in a local cache.

An operator may chose to deploy the SDV system 400 shown in FIG. 4 as opposed to the SDV system 200 shown in FIG. 2 because it allows the deployment of a more generic edge device 410, one that does not include embedded and proprietary conditional access hardware. The edge device 410 still encrypts the individual content streams, but it obtains the specific entitlement control messages (ECMs) from the ECMG 420, possibly including the control words.

Figure 5:
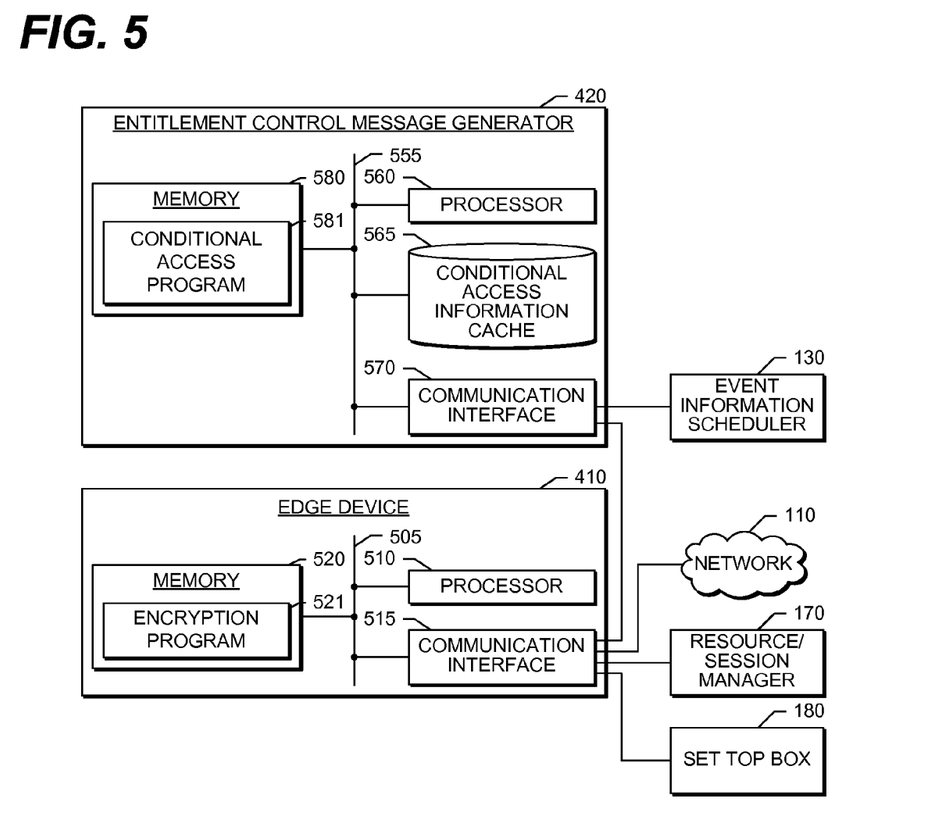
FIG. 5 is a block diagram that illustrates, in detail, one embodiment of the hardware components shown in FIG. 4.

FIG. 5 is a block diagram that illustrates, in detail, one embodiment of the hardware components shown in FIG. 4. In particular, FIG. 5 illustrates the hardware components and software comprising the edge device 410 and the entitlement control message generator 420 shown in FIG. 4.

The edge device 410, in one embodiment, is a general-purpose computing device that performs the present invention. A bus 505 is a communication medium that connects a processor 510, communication interface 515, and memory 520 (such as Random Access Memory (RAM), Dynamic RAM (DRAM), non-volatile computer memory, flash memory, or the like). The communication interface 515 connects the edge device 410 to the network 110, resource/session manager 170, set-top box 180, and entitlement control message generator 420. In one embodiment, the implementation of the edge device 410 is an application-specific integrated circuit (ASIC).

The entitlement control message generator 420, in one embodiment, is a general-purpose computing device that performs the present invention. A bus 555 is a communication medium that connects a processor 560, conditional access information cache 565 (such as rights metadata (RMD), access criteria, or the like), communication interface 570, and memory 580 (such as Random Access Memory (RAM), Dynamic RAM (DRAM), non-volatile computer memory, flash memory, or the like). The communication interface 570 connects the entitlement control message generator 420 to the edge device 410, and the event information scheduler (EIS) 130. In one embodiment, the implementation of the entitlement control message generator 420 is an application-specific integrated circuit (ASIC).

The processor 510 in the edge device 410 perform the disclosed methods by executing the sequences of operational instructions that comprise each computer program resident in, or operative on, the memory 520. The processor 560 in the entitlement control message generator 420 perform the disclosed methods by executing the sequences of operational instructions that comprise each computer program resident in, or operative on, the memory 580. The reader should understand that the memory 520 in the edge device 410 and the memory 580 in the entitlement control message generator 420 may include operating system, administrative, and database programs that support the programs disclosed in this application. In one embodiment, the configuration of the memory 520 in the edge device 410 includes an encryption program 521, and the configuration of the memory 580 in the entitlement control message generator 420 includes a conditional access program 581. The encryption program 521 converts a content stream from the network 110 into an encrypted content stream. The conditional access program 581 populates the data stored in the conditional access information cache 565, updates the data, and uses the data to create the encrypted content stream. The encryption program 521 and conditional access program 581 perform the methods of the present invention disclosed in detail in FIG. 6. When the processor 510 in the edge device 410 performs the disclosed methods, it stores intermediate results in the memory 520 in the edge device 410. When the processor 560 in the entitlement control message generator 420 performs the disclosed methods, it stores intermediate results in the memory 580 in the entitlement control message generator, or conditional access information cache 565. In another embodiment, the memory 520 in the edge device 410 may swap these programs, or portions thereof, in and out of the memory 520 as needed, and thus may include fewer than all of these programs at any one time. In another embodiment, the memory 580 in the entitlement control message generator may swap these programs, or portions thereof, in and out of the memory 580 as needed, and thus may include fewer than all of these programs at any one time.

Figure 6:
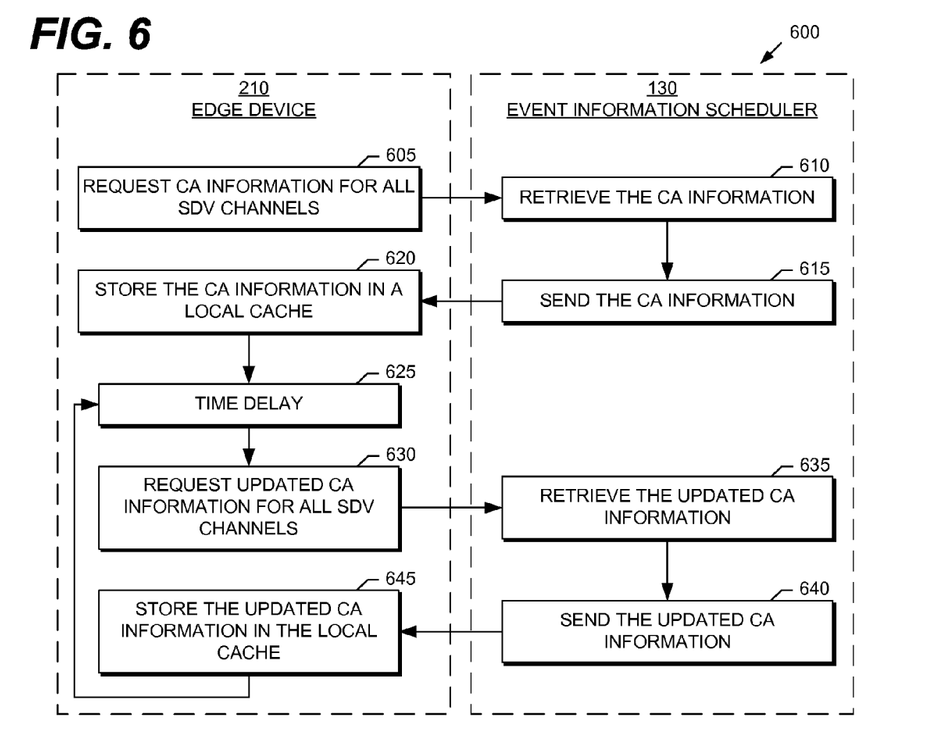
FIG. 6 is a message flow diagram that illustrates a method according to one embodiment of the present invention.

FIG. 6 is a flow diagram that illustrates a method according to one embodiment of the present invention. In particular, FIG. 6 illustrates populating and updating the data stored in the conditional access information cache 315.

The process 600 shown in FIG. 6, with reference to FIG. 2 and FIG. 3, begins by populating the conditional access information cache 315. The edge device 210 sends a request for CA information for all of the SDV channels to the EIS 130 (step 605). The EIS 130 receives the request, retrieves the requested CA information (step 610), and sends the CA information to the edge device 210 (step 615). The edge device 210 receives the CA information from the EIS 130 and stores the CA information in the conditional access information cache 315 (step 620). The process 600 delays for a period of time (step 625) before beginning the updating of the conditional access information cache 315. The duration of the time delay is a configuration parameter for the edge device 210. The edge device 210 sends a request for updated CA information for all of the SDV channels to the EIS 130 (step 630). The EIS 130 receives the request, retrieves the updated CA information (step 635), and sends the updated CA information to the edge device 210 (step 640). The edge device 210 receives the updated CA information from the EIS 130 and stores the updated CA information in the conditional access information cache 315 (step 645). The process 600 then delays for a period of time (step 625) before the next iteration of updating the conditional access information cache 315.

Figure 7:
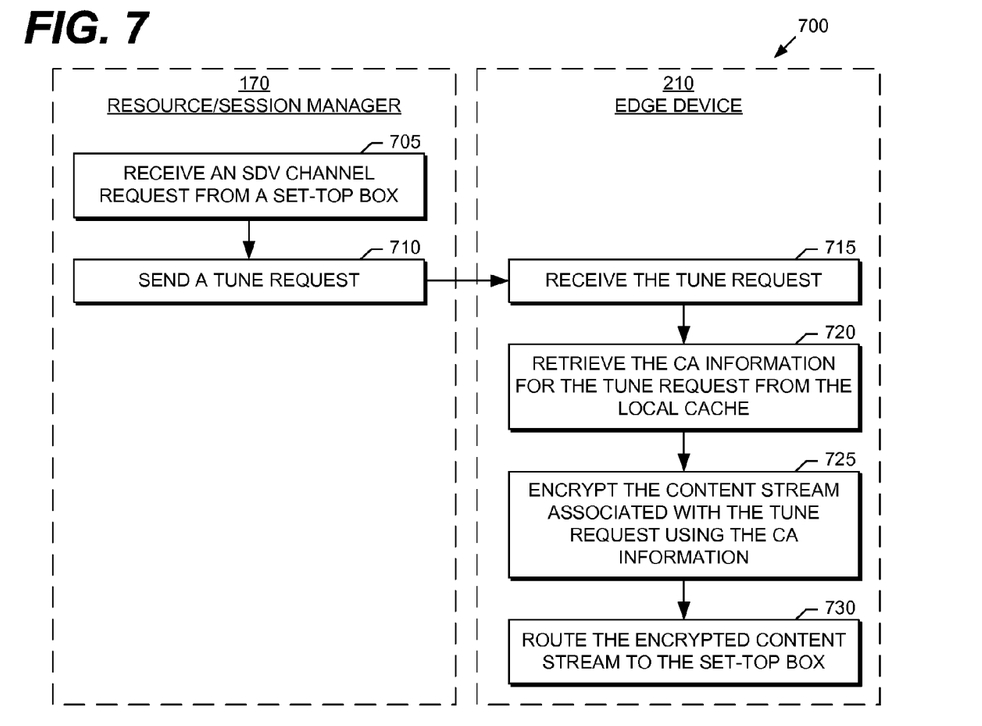
FIG. 7 is a message flow diagram that illustrates a method according to one embodiment of the present invention.

FIG. 7 is a flow diagram that illustrates a method according to one embodiment of the present invention. In particular, FIG. 7 illustrates using the data in the conditional access information cache 315 to create the encrypted content stream.

The process 700 shown in FIG. 7, with reference to FIG. 2 and FIG. 3, begins when the resource/session manager 170 receives an SDV channel request from the set-top box 180 (step 705), and sends a tune request to the edge device 210 (step 710). The edge device 210 receives the tune request (step 715), and retrieves the CA information for the tune request from the conditional access information cache 315 (step 720). The edge device 210 uses the retrieved CA information to encrypt the content stream associated with the tune request (step 725), and routes the encrypted content stream to the set-top box 180 (step 730).

Although the disclosed embodiments describe a fully functioning method and system for improving the processing performance at the edge device to avoid an undesirable tuning latency when tuning to a channel in an SDV system, the reader should understand that other equivalent embodiments exist. Since numerous modifications and variations will occur to those reviewing this disclosure, the method and system for improving the processing performance at the edge device to avoid an undesirable tuning latency when tuning to a channel in an SDV system is not limited to the exact construction and operation illustrated and disclosed. Accordingly, this disclosure intends all suitable modifications and equivalents to fall within the scope of the claims.

I claim:

1. A method for improving performance in a switched digital video (SDV) system, the method comprising:
in an edge device of the SDV system, populating and periodically updating a local cache of the edge device by iteratively:
sending, from the edge device to a second device comprising an entitlement control message generator (ECMG), a request for conditional access (CA) information for all available SDV channels;
receiving in the edge device, responsively to the request, the CA information;
storing, in the local cache, the CA information; and
delaying for a period of time before a next iteration;
the method further comprising, in the edge device:
receiving a tune request identifying a set-top box and an SDV channel from the available SDV channels;
receiving a content stream associated with the SDV channel;
retrieving, from the local cache, CA information including encryption information for the content stream, wherein the CA information for all possible SDV services is proactively fetched and stored in the local cache;
converting the content stream to an encrypted content stream using the encryption information; and
sending the encrypted content stream to the set-top box.

2. The method of claim 1, wherein the receiving of the tune request is from a resource manager in the SDV system.

3. The method of claim 1, wherein the receiving of the content stream is from a network, and the content stream is an unencrypted content stream.

4. The method of claim 1, wherein the CA information is at least one of rights metadata, and access criteria.

5. The method of claim 1, wherein after populating the local cache, periodically updating of the local cache comprises:
sending the request for CA information, wherein the request is for updated CA information for the available SDV channels.

6. A system, comprising:
a memory device resident in an edge device of a switched digital video (SDV) system; and
a processor disposed in the edge device, the processor in communication with the memory device for populating and periodically updating a local cache of the memory device, the processor configured to iteratively:
send, from the edge device to a second device comprising an entitlement control message generator (ECMG), a request for conditional access (CA) information for all available SDV channels;
receive in the edge device, responsively to the request, the CA information;
store, in the local cache, the CA information; and
delay for a period of time before a next iteration;
the processor further configured to:
receive a tune request identifying a set-top box and an SDV channel from the available SDV channels;
receive a content stream associated with the SDV channel;
retrieve, from a local cache of the memory device, CA information including encryption information for the content stream, wherein the CA information for all possible SDV services is proactively fetched and stored in the local cache;
convert the content stream to an encrypted content stream using the encryption information; and
send the encrypted content stream to the set-top box.

7. The system of claim 6, wherein the receiving of the tune request is from a resource manager in the SDV system.

8. The system of claim 6, wherein the receiving of the content stream is from a network, and the content stream is an unencrypted content stream.

9. The system of claim 6, wherein the CA information is at least one of rights metadata, and access criteria.

10. The system of claim 6, wherein to periodically update the local cache after populating the local cache, the processor is configured to:
send the request for CA information, wherein the request is for updated CA information for the available SDV channels.

11. A non-transitory computer-readable medium, comprising computer-executable instructions that, when executed by one or more processors of an edge device of a switched digital video (SDV) system, perform a method comprising:
in the edge device, populating and periodically updating a local cache of the edge device by iteratively:
sending, from the edge device to a second device comprising an entitlement control message generator (ECMG), a request for conditional access (CA) information for all available SDV channels;
receiving in the edge device, responsively to the request, the CA information;
storing, in the local cache, the CA information; and
delaying for a period of time before a next iteration;
the method further comprising, in the edge device:
receiving a tune request identifying a set-top box and an SDV channel from the available SDV channels;
receiving a content stream associated with the SDV channel;
retrieving, from the local cache, CA information including encryption information for the content stream, wherein the CA information for all possible SDV services is proactively fetched and stored in the local cache;
converting the content stream to an encrypted content stream using the encryption information; and
sending the encrypted content stream to the set-top box.

12. The non-transitory computer-readable medium of claim 11, wherein the receiving of the tune request is from a resource manager in the SDV system.

13. The non-transitory computer-readable medium of claim 11, wherein the receiving of the content stream is from a network, and the content stream is an unencrypted content stream.

14. The non-transitory computer-readable medium of claim 11, wherein the CA information is at least one of rights metadata, and access criteria.

15. The non-transitory computer-readable medium of claim 11, wherein after populating the local cache, periodically updating the local cache comprises:
sending the request for CA information, wherein the request is for updated CA information for the available SDV channels.

* * * * *